US010671647B2

(12) United States Patent
Herrin et al.

(10) Patent No.: US 10,671,647 B2
(45) Date of Patent: *Jun. 2, 2020

(54) SYSTEM AND METHOD TO IDENTIFY, GATHER, AND DETECT REUSABLE DIGITAL ASSETS

(71) Applicant: International Business Machines Corporation, Armonk, NY (US)

(72) Inventors: Bradley C. Herrin, Marina Del Ray, CA (US); Morris S. Johnson, Jr., Cary, NC (US); Matthew T. McGuigan, Raleigh, NC (US); Jarett Stein, Bryn Mawr, PA (US)

(73) Assignee: International Business Machines Corporation, Armonk, NY (US)

( * ) Notice: Subject to any disclaimer, the term of this patent is extended or adjusted under 35 U.S.C. 154(b) by 753 days.

This patent is subject to a terminal disclaimer.

(21) Appl. No.: 14/822,031

(22) Filed: Aug. 10, 2015

(65) Prior Publication Data

US 2016/0357850 A1 Dec. 8, 2016

Related U.S. Application Data

(63) Continuation of application No. 14/733,107, filed on Jun. 8, 2015.

(51) Int. Cl.
*G06Q 10/06* (2012.01)
*G06F 16/28* (2019.01)

(52) U.S. Cl.
CPC ..... *G06F 16/288* (2019.01); *G06Q 10/06313* (2013.01); *G06Q 10/063114* (2013.01)

(58) Field of Classification Search
CPC .............................. G06Q 10/00; G06Q 30/02
(Continued)

(56) References Cited

U.S. PATENT DOCUMENTS 6,189,008 B1 2/2001 Easty et al.
8,566,451 B2 10/2013 O'Connell, Jr.
(Continued)

FOREIGN PATENT DOCUMENTS

WO 0073893 A2 12/2000
WO 2005013114 A1 2/2005

OTHER PUBLICATIONS

Han et al., An Event-Driven Interactive Model of Information Resource Management, 2011 Eigth International Conference on Information Technology: New Generations, pp. 207-211, 2011.*
(Continued)

*Primary Examiner* — Robert D Rines
(74) *Attorney, Agent, or Firm* — Terrile, Cannatti & Chambers, LLP; Michael Rocco Cannatti (57) ABSTRACT

A method, system, and apparatus are provided for automating digital resource management by using monitored user interactions with digital resources to compute a user interaction metric for each digital resource upon detecting a role change for a first user having a user interaction history with the digital resources, where each user interaction metric indicates how important the first user is to the corresponding digital resource and is used to select and map a first digital resource to a second user to provide an ownership transition recommendation for the first digital resource in response to the role change for the first user.

19 Claims, 3 Drawing Sheets

(58) Field of Classification Search
USPC .................................................. 705/7.11–7.42
See application file for complete search history.

(56) References Cited

U.S. PATENT DOCUMENTS

| | | | |
|---|---|---|---|
| 8,868,506 B1 | 10/2014 | Bhargava et al. | |
| 8,874,951 B1 | 10/2014 | Chuang et al. | |
| 8,924,361 B2* | 12/2014 | Rehman | G06F 3/048 707/688 |
| 2005/0246193 A1 | 11/2005 | Roever et al. | |
| 2008/0016580 A1* | 1/2008 | Dixit | G06F 21/604 726/27 |
| 2009/0144803 A1* | 6/2009 | Schreiber | G06F 21/6218 726/1 |
| 2009/0150981 A1* | 6/2009 | Amies | H04L 63/102 726/5 |
| 2010/0115577 A1* | 5/2010 | Ratnala | G06F 21/604 726/1 |
| 2012/0311672 A1* | 12/2012 | Connor | G06F 21/604 726/4 |
| 2014/0114783 A1 | 4/2014 | O'Connor et al. | |
| 2014/0137270 A1 | 5/2014 | Dunkeld et al. | |
| 2014/0244801 A1 | 8/2014 | Bhatnagar et al. | |

OTHER PUBLICATIONS

List of IBM Patents or Applications Treated as Related.
Disclosed Anonymously, (Jan. 8, 2013). Method and System for Tracking Physical and Digital Assets in a Managed Environment. IPCOM000224864D.
Kamara J. M. et al., (2003). Conceptual framework for live capture and reuse of project knowledge. CIB Report, 284, 178.

* cited by examiner

SYSTEM AND METHOD TO IDENTIFY, GATHER, AND DETECT REUSABLE DIGITAL ASSETS

CONTINUING DATA

This application is a continuation of U.S. patent application Ser. No. 14/733,107, filed Jun. 8, 2015, entitled "System and Method to Identify, Gather, and Detect Reusable Digital Assets" which includes exemplary systems and methods and is incorporated by reference in its entirety.

BACKGROUND OF THE INVENTION

In the field of data storage and digital asset management, a user may acquire expertise and/or responsibility in connection with one or more physical or digital assets, such as computers, hardware, licensed software, accounts, digital media, processing tasks, communication assignments, project roles, website, calendars, work documents, group memberships, and the like. However, if the user changes roles or leaves an organization without fully documenting and transferring the user's asset-related activities/responsibilities, the user's role and accumulated expertise can be lost to any remaining team members, resulting in the assets becoming stale or expired and/or inefficiencies and duplication of efforts by the remaining team members who attempt to recreate the assets. As a result, the existing solutions for identifying and managing user activities pertaining to digital assets are inefficient and extremely difficult at a practical level.

SUMMARY

Broadly speaking, selected embodiments of the present disclosure provide a system, method, and apparatus for gathering, identifying and detecting reusable assets or resources associated with a user who owns, creates, or is otherwise responsible for the asset or resource by providing an automated agent that is installed on an information handling system to present a list of reusable assets or resources that need to be transferred upon detecting that the associated user changes roles or leaves an organization. Implemented to manage the ownership of reusable assets or resources, the disclosed asset tracking system is executed by the information handling system to quickly and efficiently transfer digital assets from a user by monitoring digital assets associated with the user over time, evaluating the importance of the user to each digital asset to generate asset ranking data, detecting a change in the user's role with respect to the assets, and then aggregating the asset ranking data to generate asset transition recommendations to ensure business continuity, alternate ownership, and/or other provisions for transferring digital assets to a new user or user group. In selected embodiments, the disclosed digital asset management method, system and apparatus may be implemented in a collaborative business environment to present a list of assets that need to be transferred in the event a user's role in a user group changes or ends. To this end, an automated agent or API may be installed on a user's endpoint that monitors the user's interactions with digital assets. Based on the user interactions, the automated agent/API generates a ranking of the digital assets that reflect the value of the user to each digital asset. For example, the ranking may be based at least in part on the access frequency and recency by the user, the number and/or types of uses of the digital asset, the correlation between the user interaction dates and predetermined project milestone dates, the ownership or authorship relationship between the user and digital asset (e.g., permissions), etc. In addition or in the alternative, the asset ranking may be based on the relationship between user interactions and product cycles/schedules, human resource cycles, legal/process constraints, and other downstream events. When it is time for the user to transfer his or her work, the user can return a profile of usage data for digital assets generated by the automated agent/API, wherein the profile includes the ranking of each digital asset indicating the value of the user to each digital asset. In this way, the most important digital assets associated with the user (e.g., those used most frequently or predictably by the use) can be identified and prioritized for transfer or presentation to other users in the user's business group. In addition, one or more new owners for a digital asset may be identified and recommended by analyzing how the asset was used by all persons in system, the relationships between different persons and/or assets (e.g., are they in the same group, same skillset, same usage patterns), or other desired user selection criteria.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
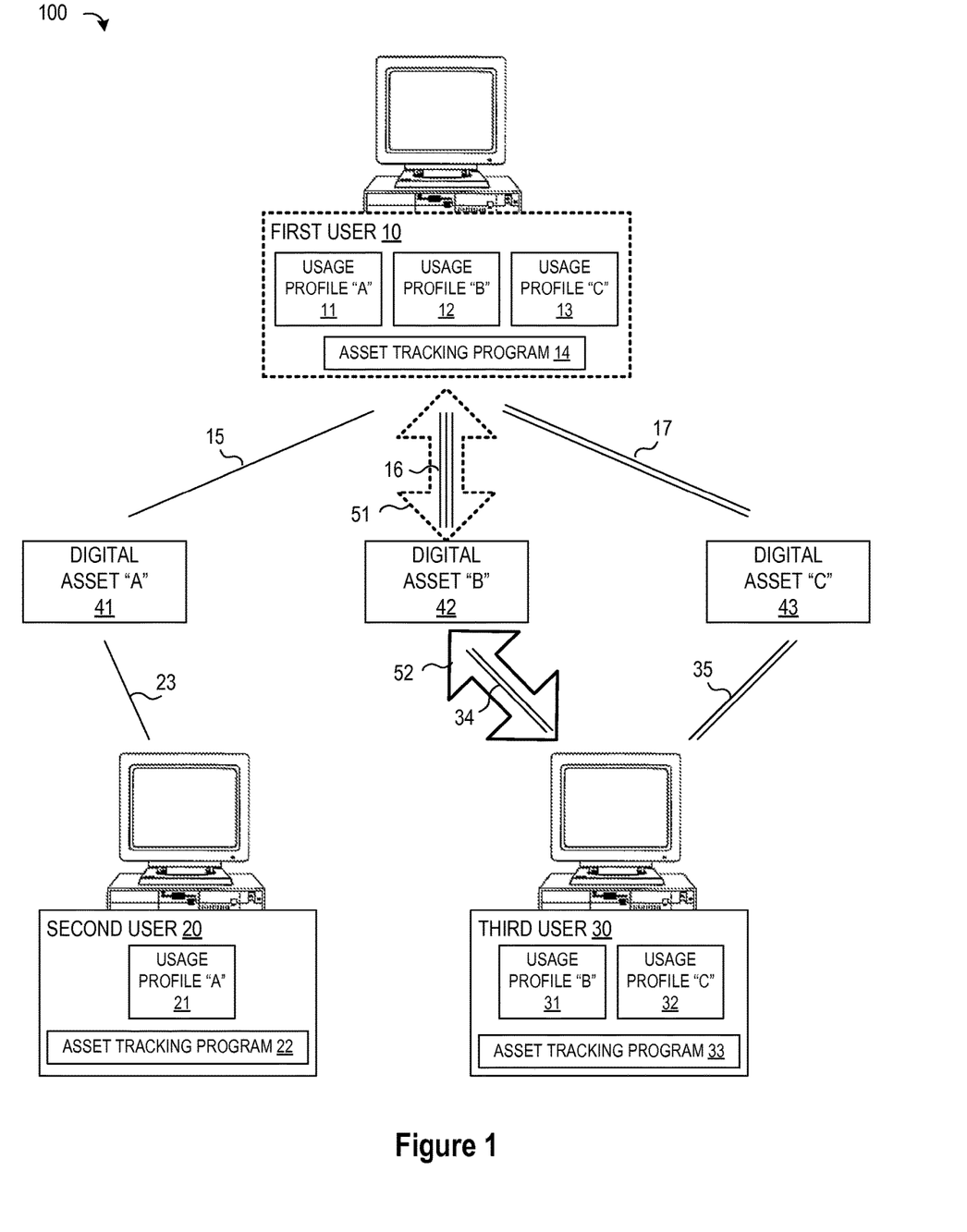
FIG. 1 depicts a schematic block diagram of one illustrative embodiment of a collaborative business environment in which a digital asset management system may be employed to identify, prioritize, and transfer asset ownership between users.

FIG. 1 depicts a schematic block diagram of one illustrative embodiment of a collaborative business environment 100 in which a digital asset management system may be employed to identify, prioritize, and transfer asset ownership between users. The depicted environment 100 includes a first user 10, second user 20, and third user 30, each of which may be implemented with a computer system that can perform at least part of a process described herein for facilitating the management of digital assets 41-43 in a manner that is responsive to user interactions therewith. It will be understood that the first, second, and third user computers 10, 20, 30 may be interconnected via a server/router, network, publicly accessible network, such as the Internet, or other communication mechanism. In addition, any number of different network devices can be substituted for the user computers. And though depicted in block diagram form, it will be appreciated that each of the digital assets 41-43 may be embodied in a computer-based component resource for the environment 100, such as computers, hardware, licensed software, email, computer queries, electronic documents, wikis, plans, source code, electronic files, accounts, digital media, processing tasks, communication assignments, project roles, website, calendars, work documents, group memberships, or any other system asset.

To manage the digital assets associated with each user, each user computer may include a digital asset tracking program which is operable to process the user's interactions with different digital assets into a profile of usage data for each digital asset. For example, the first user computer 10 may include a digital asset tracking program 14 which is operable to process the user's interactions 15-17 with the digital assets 41-43 accessed by the first user, where the relative strength, value, or importance of the user's interactions is indicated by the number of illustrated lines for each interaction. Thus, a first usage profile 11 quantifies the relatively weak or unimportant user interactions 15 between the first user 10 and the digital asset A 41, a second usage profile 12 quantifies the relatively strong or important user interactions 16 between the first user 10 and the digital asset B 42, and a third usage profile 13 quantifies a set of user interactions 17 between the first user 10 and the digital asset C 43 which have intermediate strength or importance. In similar fashion, the second user computer 20 may include a digital asset tracking program 22 which is operable to process the user's interactions 23 with the digital asset A 41 accessed by the second user by generating a first usage profile 21 which quantifies the relatively weak or unimportant user interactions 23 between the second user 20 and the digital asset A 41. In addition, the third user computer 30 may include a digital asset tracking program 33 which is operable to process the user's interactions 34-35 with the digital assets 42-43 accessed by the third user, thereby generating a first usage profile 31 which quantifies the user interactions 34 between the third user 30 and the digital asset B 42, and a second usage profile 32 which quantifies the user interactions 35 between the third user 30 and the digital asset C 43.

In each of the user endpoint computers (e.g., 10), the asset tracking program (e.g., 14) may be embodied as an automated agent that is installed to monitor, gather, and evaluate data on the user interactions (e.g., 15-17) with the associated digital assets 41-43. Using the captured user interaction data (e.g., 15-17), each asset tracking program (e.g., 14) may generate usage profile information which indicates the relative importance of the user (e.g., first user 10) to the associated digital asset, such as by evaluating the ownership relationship between the user (e.g., first user 10) and the associated digital asset or otherwise assessing user interaction information that may be useful to other users working with the first user 10. For example, the indication of relative importance may be based at least in part on the access frequency and recency by the user, the number and/or types of uses of the digital asset, the correlation between the user interaction dates and predetermined project milestone dates, the ownership or authorship relationship between the user and digital asset, the pattern of actions between the user and digital asset, and the like. In the example of FIG. 1, the asset tracking program 14 at the first user computer 10 generates the second usage profile information 12 based on the relatively strong or important user interactions 16, such as can arise when the first user computer 10 is used to author or modify the second digital asset 42 or when the first user computer 10 interacts extensively with the second digital asset 42 or when the user interactions 16 correlate to specified project milestone or calendar dates. In this way, the relatively strong or important user interactions 16 indicate an ownership or responsibility relationship 51 between the first user computer 10 and the second digital asset 42.

Using the usage profile information 11-13, 21, 31-32 assembled at the user computers 10, 20, 30, the most important digital assets at any user computer may be identified for prioritized transfer to another user in the event that a user is required to transfer his or her work. For example, if the first user 10 leaves the organization or changes roles (as indicated by the dashed lines), the usage profile information 11-13 can be used to identify and recommend the most important digital assets for transfer to another user (e.g., the third user 30). In the example of FIG. 1, the transfer is effected by using usage profile information (e.g., 31) for user interactions (e.g., 34) at another user computer (e.g., 30) to recommend a new ownership or responsibility relationship 52 between the other user computer (e.g., 30) and the second digital asset 42. As will be appreciated, the asset tracking and transfer recommendation functionality can be resident in or distributed among one or more of the user computers 10, 20, 30, or otherwise located on a networked computer-based component resource.

While FIG. 1 shows one example of a collaborative business environment 100 between a plurality of users which each employ desktop computers 10, 20, 30, it will be appreciated that any information handling system may be used for the user computers, including but not limited a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
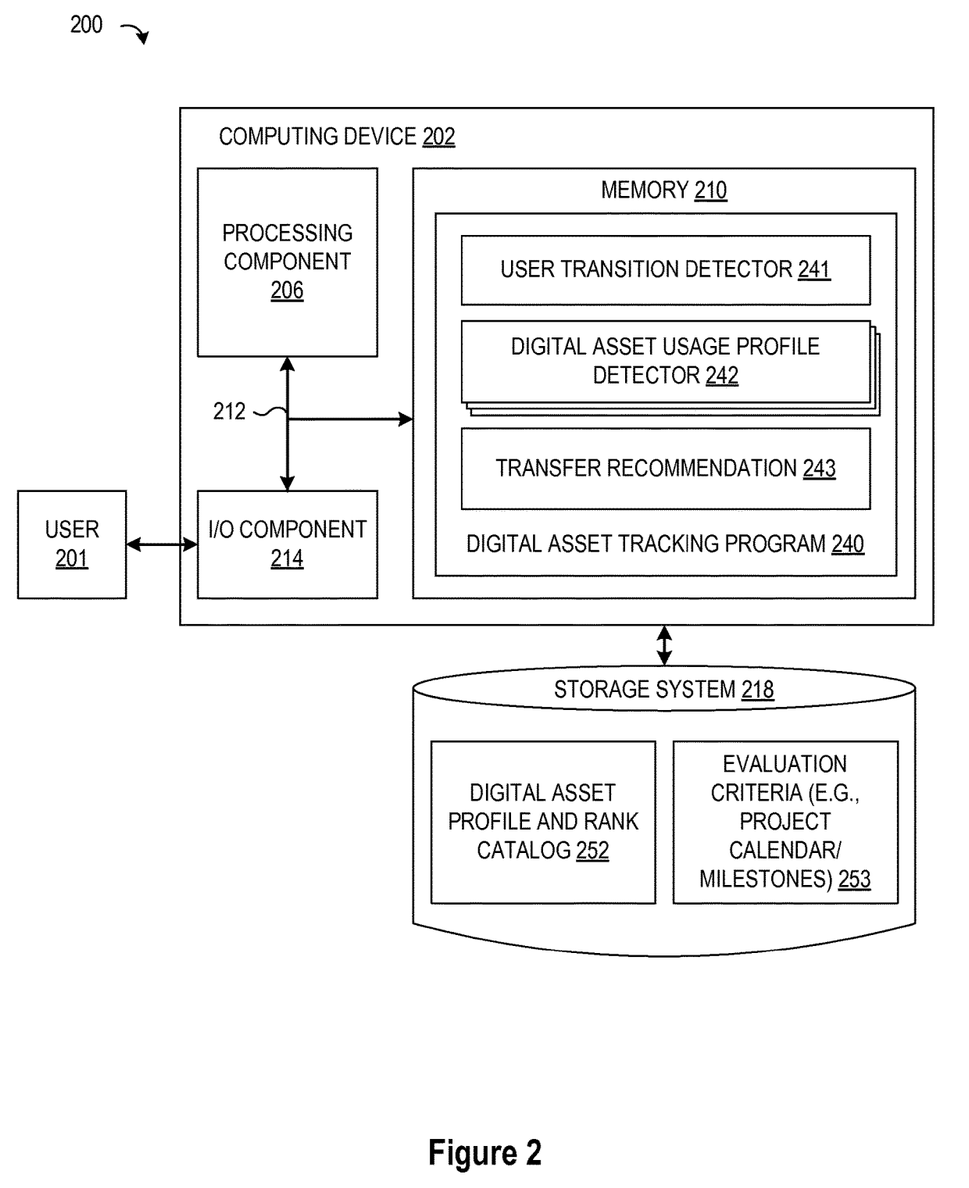
FIG. 2 depicts a block diagram of an information handling computer system with a processor and components for managing digital assets.

To provide additional details for an improved understanding of selected embodiments of the present disclosure, reference is now made to FIG. 2 which illustrates a block diagram of an information handling computer system 200 with a processor and components for running a digital asset tracking program to manage digital assets. The depicted information handling computer system 200 includes a computing device 202 that can perform a process described herein for managing digital assets associated with a user 201 who owns, creates, or is otherwise responsible for the asset(s) by providing an automated digital asset tracking program 240 that is executed to identify, gather, and detect digital assets based on specified user interactions therewith to present a list of prioritized digital assets that need to be transferred upon detecting that the associated user changes roles or leaves an organization.

Computing device 202 is shown including a processing component 206 (e.g., one or more processors), a memory 210, a storage system 218 (e.g., a storage hierarchy), an input/output (I/O) component 214 (e.g., one or more I/O interfaces and/or devices), and a communications pathway 212. In general, processing component 206 executes program code, such as the digital asset tracking program 240, which is at least partially fixed in memory 210. To this extent, processing component 206 may include a single processing unit, or be distributed across one or more processing units in one or more locations.

Memory 210 also can include local memory, employed during actual execution of the program code, bulk storage (storage 218), and/or cache memories (not shown) which provide temporary storage of at least some program code in order to reduce the number of times code must be retrieved from bulk storage 218 during execution. As such, memory 210 may include any known type of temporary or permanent data storage media, including magnetic media, optical media, random access memory (RAM), read-only memory (ROM), a data cache, a data object, etc. In addition, memory 210 may reside at a single physical location, including one or more types of data storage, or be distributed across a plurality of physical systems in various forms.

While executing program code, processing component 206 can process data, which can result in reading and/or writing transformed data from/to memory 210 and/or I/O component 214 for further processing. Pathway 212 provides a direct or indirect communications link between each of the components in computing device 202. I/O component 214 can include one or more human I/O devices, which enable a human user 201 to interact with computing device 202 and/or one or more communications devices to enable a system user 201 to communicate with computing device 202 using any type of communications link. To this extent, digital asset tracking program 240 can manage a set of interfaces (e.g., graphical user interface(s), application program interface, and/or the like) that enable human and/or system users 201 to interact with the digital asset tracking program 240. User 201 could include any member of a collaborative business group or organization who has asset-related activities or responsibilities with reference to one or more digital resources or assets, such as licensed software, email, computer queries, electronic documents, wikis, plans, source code, electronic files, accounts, digital media, processing tasks, communication assignments, project roles, website, calendars, work documents, group memberships, or any other system asset. Further, the digital asset tracking program 240 can manage (e.g., store, retrieve, create, manipulate, organize, present, etc.) the data in storage system 218, including, but not limited to a catalog of digital asset profile and rank information 252 and evaluation criteria 253, such as project-related calendar or milestone data, using any desired data management mechanism. As described herein, the catalog of digital asset profile and rank information 252 may be used to store a list of digital assets associated with the user 201 along with a corresponding importance rank value for each digital asset based on, for example, a measure of how frequently the user 201 uses the asset. To generate the importance rank values, the evaluation criteria 253 may include project or product plan information, such as calendar or milestone dates, that are compared to the user interactions to align the corresponding digital asset's purpose with specific project phases or milestones.

In selected embodiments, computing device 202 may be embodied with one or more processing components 206 (e.g., general purpose computing articles of manufacture) capable of executing program code, such as the digital asset tracking program 240, installed thereon. As used herein, it is understood that "program code" refers to any collection of instructions, in any language, code or notation, that cause a computing device having an information processing capability to perform a particular action. To this extent, the digital asset tracking program 240 can be embodied as any combination of system software and/or application software which is executed to monitor digital assets associated with the user over time, evaluate the importance of the user to each digital asset to generate asset ranking data, detect a change in the user's role with respect to the assets, and then aggregate the asset ranking data to generate asset transition recommendations. In addition, the technical effect of information handling computer system 200 is to provide processing instructions to computing device 202 in order to ensure business continuity, alternate ownership, and/or other provisions by efficiently transferring digital assets to a new user or user group by executing the digital asset tracking program 240.

Further, the digital asset tracking program 240 can be implemented using a set of modules 241-243. In this case, each module 241-243 can enable computing device 202 to perform a set of tasks used by the digital asset tracking program 240, and can be separately developed and/or implemented apart from other portions of the digital asset tracking program 240. As used herein, the term "component" means any configuration of hardware, with or without software, which implements the functionality described in conjunction therewith using any solution, while the term "module" means program code that enables a computing device 202 to implement the actions described in conjunction therewith using any solution. When fixed in a memory 210 of a computing device 202 that includes a processing component 206, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computing device 202.

When the information handling computer system 200 includes multiple computing devices 202, each computing device 202 may have at least a portion of the digital asset tracking program 240 fixed thereon (e.g., one or more modules 241-243). However, it is understood that information handling computer system 200 and the digital asset tracking program 240 are only representative of various possible equivalent computer systems that may perform a process described herein. To this extent, in other embodiments, the functionality provided by information handling computer system 200 and the digital asset tracking program 240 can be at least partially implemented by one or more computing devices that include any combination of general and/or specific purpose hardware with or without program code. In each embodiment, the hardware and program code, if included, can be created using standard engineering and programming techniques, respectively.

Regardless, when the information handling computer system 200 includes multiple computing devices 202, the computing devices can communicate over any type of communications link. Further, while performing a process described herein, the information handling computer system 200 and computing devices 202 therein can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, the digital asset tracking program 240 provides an automated mechanism to identify, gather, and capture user interaction with digital assets assigned to a user or group over specified usage periods. In selected embodiments, the user transition detector module 241 may be configured to detect when a person or user leaves a team, such as by detecting deactivation of a user ID, detecting movement of a user ID inside an organization, or the like. For example, the user transition detector module 241 may assert a flag or trigger upon detecting that a user's role changes within a business organization, such as when a user's ID is changed or decommissioned. As disclosed herein, the user transition detector module 241 may be configured to automatically detect user transitions, such as by periodically accessing one or more backend systems (e.g., human resource database system(s)) to monitor and/or request user ID status changes or deactivations, thereby providing a passive or automated detection functionality. In addition or in the alternative, the user transition detector module 241 may be configured to detect user transitions in response to a user activation or prompt, such as by providing a user transition tool which may be flagged or activated (e.g., by management or human resources personnel) to manually indicate a user ID status change or deactivation, thereby providing an active or manually activated detection functionality. As seen the foregoing, the user transition detector module 241 may be implemented in whole or in part at the computing devices 202 and/or other backend systems.

Once triggered by the user transition detector module 241, the digital asset usage profile detector module 242 may be configured to gather digital assets that may be of interest to the remaining group. Alternatively, the digital asset gathering may occur continuously in real time to create an audit trail that can be evaluated after the fact. In either case, digital asset gathering would not only inspect files left behind on the user's laptop or network share, but would also search systems which the user accessed and any other digital asset(s) associated with the user's ID. An example digital asset would be a code development tool in which a user has access to various artifacts, such as (private/shared) queries, plans, or source code. In the event that one of the user's artifacts (e.g., a query) could be useful to other team member users, this artifact could be flagged as a digital asset by the digital asset usage profile detector module 242. In another example, the assets in a cloud (e.g., images, virtual systems, files on virtual systems, etc.) that are provisioned over time could be compared to the base image by the digital asset usage profile detector module 242 to identify differences therebetween and gather a resulting list of changed files and metadata about the files to determine or predict the importance of the files. For instance, as physical resources become scarcer and users increasingly run their primary systems "in the cloud," there could be significant intellectual property loss as these images are de-provisioned and written over by new virtual deployments.

Once the digital assets are gathered, the transfer recommendation module 243 may be configured to flag one or more digital assets as being "of interest" for possible transfer when associated with a transitioning user (e.g., a user who is leaving a group or team or otherwise changing his or her role) who is identified as owning or being responsible for one or more digital assets (e.g., the user is the creator of the digital asset(s) or has a user ID associated with the digital asset(s)). In addition or in the alternative, a user transition could trigger the transfer recommendation module 243 to start an agent to find and extract information about the transitioning user's interactions with the associated digital assets. Based on the detected user interactions, the transfer recommendation module 243 may then prioritize the associated digital assets in terms of the user's importance to those assets, such as by evaluating the type and/or frequency of user interactions with the assets. For example, a digital asset that has user interactions that are frequent or predictable or consistent with a specified project schedule may be identified as a high value asset that should be reassigned and/or presented to the group as something of interest. In contrast, a digital asset that is used infrequently or not at all may be identified as a low value asset that is not a candidate for reassignment. As disclosed herein, the transfer recommendation module 243 may use a number of other customizable options to rank the importance of flagged digital assets for possible transfer. For example, specified business roles (e.g., manager, project lead, developer) for the transitioning user may result in the digital asset being ranked as an important asset that is recommended for transfer. In addition or in the alternative, specified user interactions (e.g., frequent use or modification of the digital asset) or behaviors (e.g., creating, reading, updating, modifying, saving, or deleting) by the transitioning user may result in the digital asset being ranked as an important asset that is recommended for transfer. In addition or in the alternative, interactions by the transitioning user may be compared against interactions with other users (e.g., in emails, comments) to evaluate the importance of the digital asset for possible transfer. The interactions by the transitioning user with another user (e.g., manager or supervisor) may also be compared to the digital assets that can be accessed by the other user to evaluate the importance of the digital asset for possible transfer. In addition or in the alternative, specified user interactions or behaviors by the transitioning user may be grouped over specified time intervals (e.g., by month, week, quarter, year) to look for patterns which map or correspond to specified project cycles or dates to evaluate the importance of the transitioning user to the digital asset for possible transfer.

To assist with the transfer recommendation functionality, the transfer recommendation module 243 may also access digital asset usage profile for other members of the user's business group to identify users who also have an important association with a specified digital asset to identify one or more candidate users who could be assigned to the asset. For example, transfer recommendation module 243 may suggest new delegates to own a digital asset and/or asset responsibilities by identifying users who also modified/viewed assets that are deemed important by the system. The digital asset usage profile for other members of the user's business group may be accessed from the catalog of digital asset profile and rank information 252 stored in the storage system 218 or stored at other computing devices in the information handling computer system 200.

Figure 3:
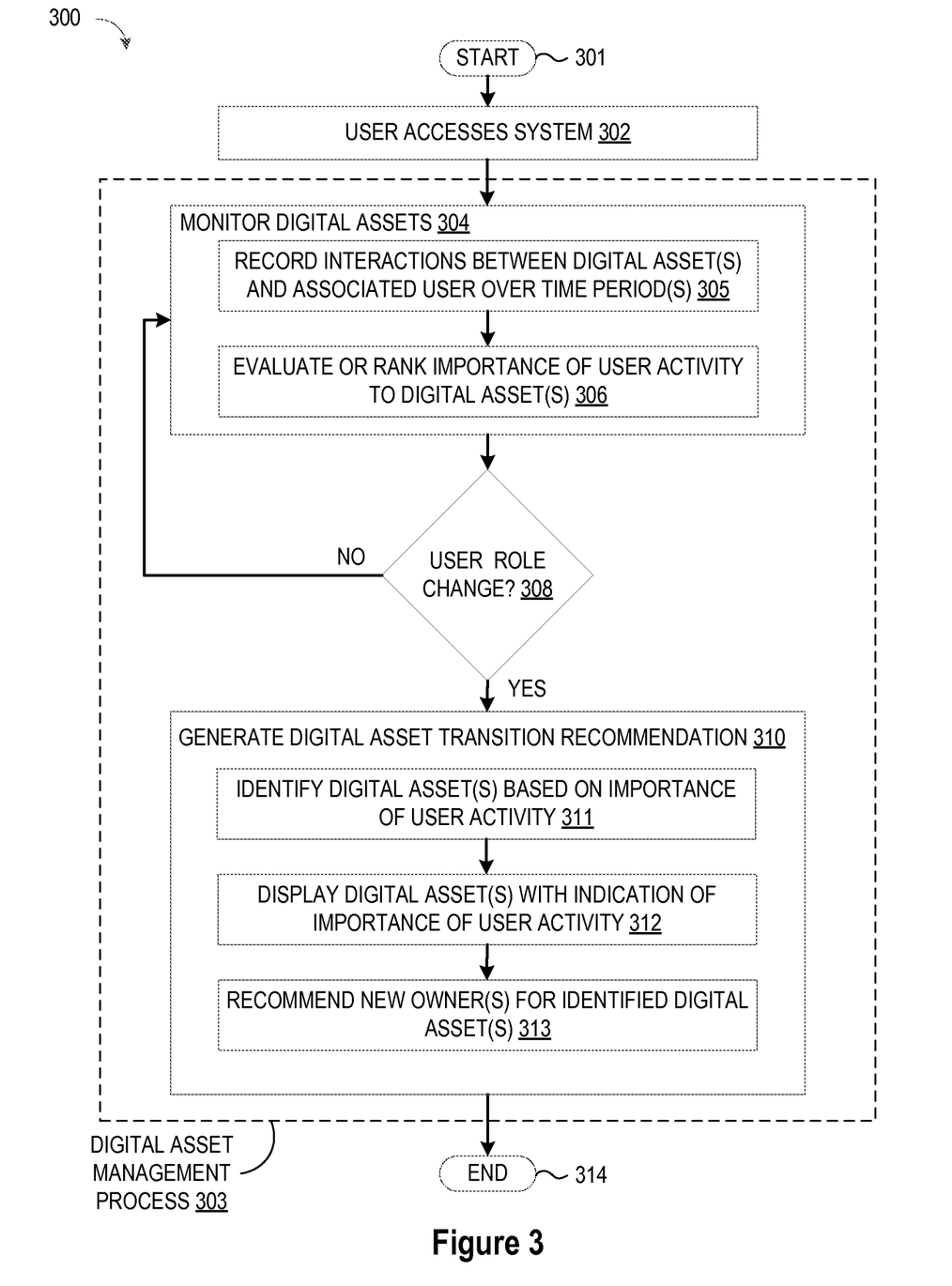
FIG. 3 illustrates a simplified flow chart showing the logic for efficiently monitoring digital assets and generating transfer recommendations upon detecting a changed user role.

To provide additional details for an improved understanding of selected embodiments of the present disclosure, reference is now made to FIG. 3 which depicts a simplified flow chart 300 showing the logic for efficiently monitoring digital assets and generating transfer recommendations upon detecting a changed user role. The processing shown in FIG. 3 may be performed in whole or in part by an information handling system which runs a digital asset tracking program 240 to monitor re-usable digital assets, to detect a role transition for a user associated with specified digital assets, and to quickly and efficiently generate a digital asset transition recommendation for important digital assets associated with the transitioning user.

FIG. 3 processing commences at 301 whereupon, at step 302, a user accesses a system, such as by registering, logging in, or otherwise sending an access or search request to a system. Step 302 may be performed at the information handling computer system 200 or other computer system as an initial processing step wherein the user access is captured, processed, and stored. The specific access procedures and mechanisms may vary from one system to the next, though the system access may enable detection of the usage scenario associated with the user.

To provide a digital asset management process 303 which identifies, gathers, and detects reusable digital assets which may be recommended for transfer from a transitioning user to a new user, the information handling computer system 200 or other computer system monitors one or more digital assets or resources at step 304. In accordance with selected embodiments, the monitoring step 304 may be implemented with two sub-steps 305, 306. In the first sub-step 305, the monitoring process records interactions between digital assets and associated users over specified time periods. For example, a list of heterogeneous systems having digital assets may be used to watch or monitor the digital assets and associated user interactions, where the list may be updated with new digital assets as new user endpoints are discovered. Examples of such heterogeneous systems include, but are not limited to code development tools, email systems, virtual machine systems, cloud images, project schedule tools, internal or external webpages, etc. As disclosed herein, the recording process (305) may gather data using client level APIs and/or agents that are installed on various endpoints containing the digital assets and/or user endpoint computers. Each installed agent/API may be configured to record or retrieve usage data for each user over time to build a usage profile for each user of interactions with associated digital assets. By recording the interactions of users (e.g., users who are owners, managers, or editors of a digital asset), the system is able to identify which digital assets are associated with a particular user. And by recording user interactions over time, the recorded usage data may be used to identify usage patterns which correlate with calendar-based ranking criteria among product schedules, industry conferences, problem management databases, email databases, virtual collaborative workspaces, product announcements, capital/expense systems, finance/accounting systems, conference call-in usage, etc. In selected server/client system embodiments, the recording process 305 may identify digital assets that a user owns or uses by accessing a table of stored audit trail information for the user which specifies which digital assets have been accessed, when the access occurred, which fields were touched, etc. For example, an electronic document may have revision history information stored within the file that could be accessed.

The monitoring of digital assets may also include a second sub-step 306 which evaluates or ranks the importance of the recorded user interactions to the associated digital assets. For example, the evaluation step 306 may calculate the importance of a user to each digital asset based on the interaction frequency by the user (e.g., with a high frequency indicating high importance), the type of usage by the user (e.g., with content creation or modification indicating high importance), how many total users interact with the asset (e.g., with many users indicating high importance). In addition or in the alternative, the evaluation step 306 may calculate the importance of a user to each digital asset based on how closely the user interactions correlate or align with specified calendar dates or milestones in a project timeline. To this end, the evaluation step 306 may retrieve project timelines stored in a spreadsheet or project management system for comparison to user interactions retrieved from an asset modification or revision history.

Either before or after the digital asset monitoring step 304, a change in the role or status of a user within a business organization is detected at step 308. For example, the user role change detection step 308 may assert a flag or trigger upon detecting that a user's role changes within a business organization, such as when a user's ID is changed or decommissioned or when the user's report chain or responsibilities are changed. As disclosed herein, the user role change detection step 308 may automatically detect user transitions, such as by periodically accessing one or more backend systems (e.g., human resource database system(s)) to monitor and/or request user ID status changes or deactivations, thereby providing a passive or automated detection functionality. In addition or in the alternative, the user role change detection step 308 may be configured to detect user transitions in response to a user activation or prompt, such as by providing a user transition tool which may be flagged or activated (e.g., by management or human resources personnel) to manually indicate a user ID status change or deactivation, thereby providing an active or manually activated detection functionality. If no change is detected (negative outcome to decision step 308), the process continues to monitor the digital assets (304). However, if a change is detected (affirmative outcome to decision step 308), the process proceeds to generate a digital asset transition recommendation (step 310).

Using the recorded and ranked user interactions generated at step 304, one or more digital asset transition recommendations may be generated at step 310 to provide a recommendation report on which assets from the transitioning user should be kept and a transitioned to a new user. Generally speaking, the digital asset transition recommendation may be generated at step 310 using the transfer recommendation module 243, though any desired information processing system for generating transition recommendations may be used.

In accordance with selected embodiments, the transition recommendation step 310 may be implemented with one or more sub-steps. In a first example sub-step 311, one or more digital assets are identified based on the evaluated user activity importance. For example, one or more digital asset transition recommendations associated with a transitioning user may be identified to include only digital assets having an evaluated importance ranking above a minimum threshold setting.

In a second example sub-step 312, identified digital assets are displayed with an indication of the importance of the user activity to the digital asset. For example, a filterable list of digital assets associated with a transitioning user which are identified at step 311 may be displayed at step 312 to visually indicate the digital assets along with an identification of the transitioning user, the associated job role(s) for the user, and the associated project(s) in order to visually convey which digital assets require re-assignment of ownership or to otherwise prevent deletion. An example visual indication may include a heat map wherein highly ranked digital assets (e.g., assets having user interaction patterns which closely matches a set of project milestones) are colored "red" to indicate high importance, while lower ranked digital assets (e.g., assets having user interaction patterns which do not correlate with the set of project milestones) are colored "blue" to indicate low importance. As a result of the display step 312, the system presents a view for a specific user (e.g., "Joe") which shows the digital assets associated with the user, or at least the most important digital assets for that user. Alternatively, the system can filter the view to show the user (e.g., "Joe") with a specific product and a list of all digital assets that Joe uses in connection with the specific product.

In a third example sub-step 313, one or more new owners or users are recommended for each identified digital asset. For example, a list of one or more potential new owners may be identified in a visual display at step 313, where the new owners are selected from the other users who have accessed or modified the digital asset in question. The selection process may also take into account the candidate owner's skills information, peer or employee status, historical manager information, or similar selection factors. In this way, the recommendation process 313 can suggest users who have similar usage profile as the transitioning user to assume ownership or responsibility for the transitioning user's work. As will be appreciated, steps 312 and 313 can be combined to display a single report on which assets should be kept, along with a list of one or more potential new owners for each asset.

By now, it will be appreciated that there is disclosed herein a system, method, apparatus, and computer program product for automating digital resource management with an information handling system having a processor and a memory. As disclosed, the system, method, apparatus, and computer program product monitor user interactions with one or more digital resources, such as by using an automated agent installed on one or more user endpoint devices. In selected embodiments, the automated agent monitors user interactions by recording digital resource ownership activity between the first user and the one or more digital resources over one or more specified time periods. Either before or after the monitoring of user interactions, a role change is detected for a first user having a user interaction history with the one or more digital resources, such as by detecting deactivation of a user ID associated with the first user or detecting a change in the user ID associated with the first user. Upon detecting a role change for the first user, a user interaction metric is computed for each of the one or more digital resources, where each user interaction metric indicates how important the first user is to the corresponding digital resource. In selected embodiments, the computation of the user interaction metric includes computing a first user interaction metric for the first digital resource based on the first user's access frequency, access recency, access type, access permission, or authorship relationship for the first digital resource, where the first user interaction metric indicates how important the first user is to the first digital resource. In other embodiments, the computation of the user interaction metric includes computing a first user interaction metric for the first digital resource based on a correlation measure between the first user's interaction dates with the first digital resource and predetermined project milestone dates associated with the first digital resource, where the first user interaction metric indicates how important the first user is to the first digital resource. Using the computed user interaction metrics, a first digital resource is selected from the one or more digital resources based on the user interaction metric for said first digital resource. For example, the first digital resource may be selected which has a user interaction metric which meets or exceeds a minimum threshold setting. In addition, the first digital resource is mapped to at least a second user to provide an ownership transition recommendation for the first digital resource in response to the role change for the first user. Based on the mapping information, the system may display the ownership transition recommendation for the first digital resource, such as by displaying a visual identification of the first user, a visual identification of each of the one or more digital resources, and an ownership transition recommendation for each of the one or more digital resources.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for automated digital resource management, the method comprising:
   monitoring, by the system, user interactions with one or more digital resources using an automated agent installed on one or more user endpoint devices;
   detecting, by the system, a role change for a first user having a user interaction history with the one or more digital resources;
   computing, by the system, a usage profile for each digital resource associated with the first user based on the monitoring of the user interactions with the first user, where each usage profile indicates how important the first user is to the corresponding digital resource;
   selecting, by the system, a first digital resource from the one or more digital resources based on a first usage profile for said first digital resource;
   correlating, by the system, the first usage profile to a second usage profile for said first digital resource associated with a second user to identify an ownership transition recommendation for the first digital resource from the first user to the second user in response to the role change for the first user; and
   generating, based on the correlating of the first and second usage profiles by the system, a graphical user interface comprising a visual identification of at least the first digital resource, a visual identification reflective of a relative importance of the first user to the first digital resource that is based on the first usage profile, and the ownership transition recommendation for the first digital resource from the first user to the second user.

2. The method of claim 1, wherein monitoring user interactions comprises recording digital resource ownership activity between the first user and the one or more digital resources over one or more specified time periods.

3. The method of claim 1, wherein detecting the role change for the first user comprises detecting deactivation of a user ID associated with the first user or detecting a change in the user ID associated with the first user.

4. The method of claim 1, wherein computing the usage profile comprises computing a first usage profile for the first digital resource based on the first user's access frequency, access recency, access type, access permission, or authorship relationship for the first digital resource, where the first usage profile indicates how important the first user is to the first digital resource.

5. The method of claim 1, wherein computing the usage profile comprises computing a first usage profile for the first digital resource based on a correlation measure between the first user's interaction dates with the first digital resource and predetermined project milestone dates associated with the first digital resource, where the first usage profile indicates how important the first user is to the first digital resource.

6. The method of claim 1, wherein selecting the first digital resource comprises selecting the first digital resource when the first usage profile meets or exceeds a minimum threshold setting.

7. The method of claim 1, further comprising displaying, by the system, the ownership transition recommendation for the first digital resource.

8. A method, in an information handling system comprising a processor and a memory, for automated digital resource management, the method comprising:
monitoring, by the system, user interactions with one or more digital resources using an automated agent installed on one or more user endpoint devices;
detecting, by the system, a role change for a first user having a user interaction history with the one or more digital resources;
computing, by the system, a usage profile for each of the one or more digital resources based on the monitoring of the user interactions, where each usage profile indicates how important the first user is to the corresponding digital resource;
selecting, by the system, a first digital resource from the one or more digital resources which has a first usage profile which meets or exceeds a minimum threshold setting;
correlating, by the system, the first usage profile to a second usage profile for said first digital resource associated with a second user to identify an ownership transition recommendation for the first digital resource from the first user to the second user in response to the role change for the first user; and
generating, based on the correlating of the first and second usage profiles by the system, a graphical user interface visual identification comprising the ownership transition recommendation and a heat map visual identification of an importance measure for the first digital resource associated with the first user that is based on the first usage profile computed for the first digital resource.

9. The method of claim 8, wherein monitoring user interactions comprises recording digital resource ownership activity between the first user and the one or more digital resources over one or more specified time periods.

10. The method of claim 8, wherein detecting the role change for the first user comprises detecting deactivation of a user ID associated with the first user or detecting a change in the user ID associated with the first user.

11. The method of claim 8, wherein computing the usage profile comprises computing a first usage profile for the first digital resource based on the first user's access frequency, access recency, access type, access permission, or authorship relationship for the first digital resource, where the first user interaction metric indicates how important the first user is to the first digital resource.

12. The method of claim 8, wherein computing the usage profile comprises computing a first usage profile for the first digital resource based on a correlation measure between the first user's interaction dates with the first digital resource and predetermined project milestone dates associated with the first digital resource, where the first user interaction metric indicates how important the first user is to the first digital resource.

13. The method of claim 8, further comprising displaying a visual identification of the first user, a heat map visual identification of an importance measure for each digital resource that is based the user interaction metric computed for the digital resource, and the ownership transition recommendation for the first digital resource associated with the first user.

14. A method, in an information handling system comprising a processor and a memory, for automated digital resource management, the method comprising:
monitoring, by the system, user interactions with one or more digital resources using an automated agent installed on one or more user endpoint devices;
detecting, by the system, a role change for a first user having a user interaction history with the one or more digital resources;
computing, by the system, a usage profile for each of the one or more digital resources based on monitoring of the first user's access frequency, access recency, access type, access permission, or authorship relationship for the first digital resource, where each usage profile indicates how important the first user is to the first digital resource;
selecting, by the system, a first digital resource from the one or more digital resources based on a first usage profile for said first digital resource;
correlating, by the system, the first usage profile to a second usage profile for said first digital resource associated with a second user to identify an ownership transition recommendation for the first digital resource from the first user to the second user in response to the role change for the first user; and
generating, based on the correlating of the first and second usage profiles by the system, a graphical user interface visual identification comprising the ownership transition recommendation and a heat map visual identification of an importance measure for the first digital resource associated with the first user that is based on the first usage profile computed for the first digital resource.

15. The method of claim 14, wherein monitoring user interactions comprises recording digital resource ownership activity between the first user and the one or more digital resources over one or more specified time periods.

16. The method of claim 14, wherein detecting the role change for the first user comprises detecting deactivation of a user ID associated with the first user or detecting a change in the user ID associated with the first user.

17. The method of claim 14, wherein computing the usage profile comprises computing the first usage profile for the first digital resource based on a correlation measure between the first user's interaction dates with the first digital resource and predetermined project milestone dates associated with the first digital resource.

18. The method of claim 14, further comprising displaying a visual identification of the first user, a heat map visual identification of an importance measure for each digital resource that is based on the usage profile computed for the digital resource, and the ownership transition recommendation for the first digital resource associated with the first user.

19. The method of claim 18, where displaying the ownership transition recommendation for the first digital resource comprises displaying the heat map visual identification with highly ranked digital assets colored with a first color to indicate high importance and with lower ranked digital assets colored with a second color to indicate low importance.

* * * * *